(12) United States Patent
Ozawa et al.

(10) Patent No.: US 8,972,365 B2
(45) Date of Patent: Mar. 3, 2015

(54) STORAGE SYSTEM AND STORAGE DEVICE

(75) Inventors: Toshihiro Ozawa, Yokohama (JP); Kazutaka Ogihara, Hachioji (JP); Yasuo Noguchi, Kawasaki (JP); Tatsuo Kumano, Kawasaki (JP); Masahisa Tamura, Kawasaki (JP); Jun Kato, Kawasaki (JP); Ken Iizawa, Yokohama (JP); Kazuichi Oe, Yokohama (JP); Munenori Maeda, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 163 days.

(21) Appl. No.: 13/613,046

(22) Filed: Sep. 13, 2012

(65) Prior Publication Data
US 2013/0138604 A1     May 30, 2013

(30) Foreign Application Priority Data

Nov. 24, 2011     (JP) ................................ 2011-256710

(51) Int. Cl.
*G06F 17/30*     (2006.01)

(52) U.S. Cl.
USPC ........... 707/696; 707/610; 707/640; 707/661; 707/802; 707/674

(58) Field of Classification Search
CPC ................................................ G06F 17/30864
USPC .................. 707/610, 640, 661, 674, 696, 802
See application file for complete search history.

(56) References Cited

U.S. PATENT DOCUMENTS

| 2010/0153337 A1 | 6/2010 | Murata | |
|---|---|---|---|
| 2012/0131309 A1* | 5/2012 | Johnson et al. | 712/41 |
| 2013/0117766 A1* | 5/2013 | Bax et al. | 719/323 |

FOREIGN PATENT DOCUMENTS

JP     2010-146067 A     7/2010

OTHER PUBLICATIONS

Jeff Terrace et al., "Object Storage on CRAQ, High-throughput chain replication for read-mostly workloads," USENIX Annual Technical Conference, San Diego, CA, pp. 1-16 (Jun. 2009).
Robbert Van Renesse etal., "Chain Replication for Supporting High Throughput and Availability," USENIX Association OSDI' 04, 6th Conference on Symposium on Operation Systems Design and Implementation.

* cited by examiner

*Primary Examiner* — Sana Al Hashemi
(74) *Attorney, Agent, or Firm* — Fujitsu Patent Center

(57) ABSTRACT

A storage system having a plurality of storages. The each of the storages include a memory and a processor coupled to the memory. The processor executes a process including transmitting an update request for data which is commonly stored in the plurality of storages according to a predetermined transmission order indicating a path to transfer the update request. The process includes updating data when receiving an update request from another storage. The process includes changing the predetermined transmission order to a transmission order in which one or more storages included in the path are excluded according to the number of times the update request for the data is received.

15 Claims, 15 Drawing Sheets

FIG.4A

| CHAIN ID | REPLICA TYPE | FRONT REPLICA | REAR REPLICA | UPDATE FREQUENCY | REFERENCE FREQUENCY |
|---|---|---|---|---|---|
| 1 | 1st | - | NODE 11 | 4 | 4 |
| ⋮ | | | | | |

| CHAIN ID | REPLICA TYPE | FRONT REPLICA | REAR REPLICA | UPDATE FREQUENCY | REFERENCE FREQUENCY |
|---|---|---|---|---|---|
| 1 | 2nd | NODE 10 | NODE 12 | 4 | 7 |
| ⋮ | | | | | |

FIG.4C

| CHAIN ID | REPLICA TYPE | FRONT REPLICA | REAR REPLICA | UPDATE FREQUENCY | REFERENCE FREQUENCY |
|---|---|---|---|---|---|
| 1 | 3rd | NODE 11 | - | 4 | 9 |
| ⋮ | | | | | |

FIG.5

| CHAIN ID | PHANTOM REPLICA | UPDATE DATA |
|---|---|---|
| 1 | NODE 11 | UPDATE 1, UPDATE 2... |
| ⋮ | | |

| CHAIN ID | TEMPORARY REPLICA |
|---|---|
| 1 | NODE 11a |
| 1 | NODE 11b |
| ⋮ | |

23c

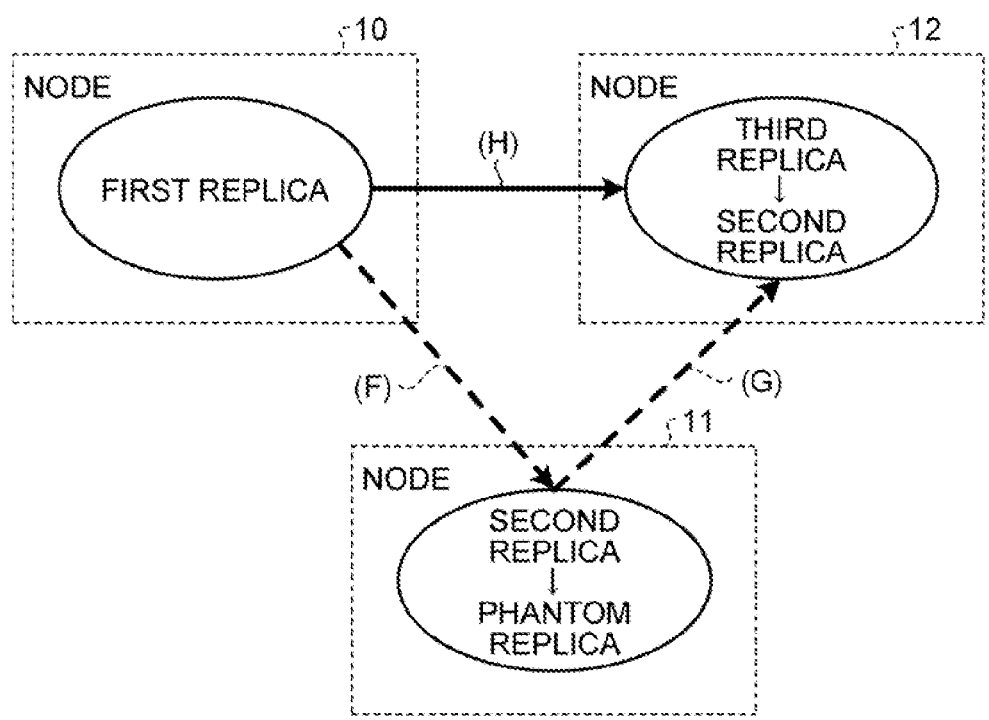

FIG.8A

| CHAIN ID | REPLICA TYPE | FRONT REPLICA | REAR REPLICA | UPDATE FREQUENCY | REFERENCE FREQUENCY |
|---|---|---|---|---|---|
| 1 | 1st | - | NODE 11 ↓ NODE 12 | 4 | 4 |
| ⋮ | | | | | |

FIG.8B

| CHAIN ID | REPLICA TYPE | FRONT REPLICA | REAR REPLICA | UPDATE FREQUENCY | REFERENCE FREQUENCY |
|---|---|---|---|---|---|
| 1 | 2nd | NODE 11 ↓ NODE 10 | - | 4 | 9 |
| ⋮ | | | | | |

STORAGE SYSTEM AND STORAGE DEVICE

CROSS-REFERENCE TO RELATED APPLICATION

This application is based upon and claims the benefit of priority of the prior Japanese Patent Application No. 2011-256710, filed on Nov. 24, 2011, the entire contents of which are incorporated herein by reference.

FIELD

The embodiments discussed herein are directed to a storage system, a storage device, a system control program, and a system control method.

BACKGROUND

A technique has been known which arranges replicas, which are copies of data, in a plurality of nodes in storage systems including NoSQL, such as a distributed Key-Value Store (KVS). In the storage system to which the technique is applied, since the replicas are arranged in a plurality of nodes, data loss due to a disk failure is prevented. In addition, since data is allowed to be read from the replica arranged in each node, an access load is distributed.

In some case, the storage system requires strong consistency for guaranteeing the identity of data read from each replica. A chain replication technique has been known as an example of a method of maintaining the strong consistency. An example of the storage system to which the chain replication technique is applied will be described below.

First, an example of the process of the storage system when a client issues a Put request will be described with reference to FIG. 14. FIG. 14 is a first diagram illustrating an example of the chain replication. In the example illustrated in FIG. 14, a storage system to which Chain Replication with Apportioned Query (CRAQ) is applied as an example of the chain replication will be described.

In the example illustrated in FIG. 14, the storage system includes N nodes with the same replica. In the example illustrated in FIG. 14, nodes other than a first node, a second node, a third node, and an N-th node among the N nodes of the storage system are not illustrated.

When receiving the Put request issued by the client, each node of the storage system sequentially transmits an update request to write data along the path in which the nodes are sequentially arranged. For example, in the example represented by (A) in FIG. 14, the client issues the Put request to the first node. In this case, the first node prepares to write new data and transmits the update request to the second node as represented by (B) in FIG. 14.

Then, when receiving the update request from the first node, the second node prepares to write new data and transmits the update request to the third node. Then, each node sequentially transmits the update request to the N-th node, which is the last node of the path. As represented by (C) in FIG. 14, when receiving the update request, the N-th node, which is the last node of the path, writes new data and transmits an updated request, which is a response to the update request, to the previous node.

Then, when receiving the updated request, each node writes the prepared data and sequentially transmits the updated request to the first node, which is a start point, along the path. Then, as represented by (D) in FIG. 14, when receiving the updated request, the first node writes the prepared data and notifies the client that the writing process has ended.

Next, an example of the process performed by the storage system when the client issues a Get request will be described with reference to FIG. 15. FIG. 15 is a second diagram illustrating an example of the chain replication. In the example illustrated in FIG. 15, each of the first to N-th nodes transmits data for the stored replica in response to the Get request from each of the clients 17a to 17d. As such, the storage system distributes the destinations of the Get request, thereby improving the performance for the Get request.

In a case in which each node other than the N-th node prepares to write data, when the Get request is received from the client, the N-th node, which is the last node of the path, is inquired whether to write new data. When the N-th node writes new data, each node transmits data for the replica after the new data is written to the client. When the N-th node does not write new data, each node transmits data for the replica before new data is written to the client.

For example, when the Get request is acquired from the client for the time from the transmission of the update request to the reception of the updated request, the first node inquires the N-th node about whether to write new data, as represented by (E) in FIG. 15. When receiving a response indicating that the new data has been written from the N-th node, the first node outputs data after the new data is written to the client. When receiving a response indicating that the new data has not been written from the N-th node, the first node outputs data before the new data is written to the client.

Patent Document 1: Japanese Laid-open Patent Publication No. 2010-146067

Non-Patent Document 1: Object Storage on CRAQ, High-throughput chain replication for read-mostly workloads, Jeff Terrace and Michael J. Freedman Princeton University, USENIX annual Technical Conference. San Diego, Calif., June 2009

Non-Patent Document 2: Chain Replication for Supporting High Throughput and Availability, Robbert van Renesse, Fred B. Schneider, USENIX Association OSDI' 04:6th Symposium on Operation Systems Design and Implementation However, in the above-mentioned chain replication technique, it is difficult to change the number of nodes with the replica. Therefore, it is difficult to adjust the performance for the Put request and the performance for the Get request.

That is, when the number of nodes storing the replica increases, the performance for the Get request is also improved. However, when the number of nodes storing the replica increases, the number of destinations to which data is written increases, which results in the deterioration of the performance for the Put request. In addition, when the number of nodes storing the replica is reduced, the performance for the Put request is improved, but the number of replicas, which are the destinations of the Get request, is reduced. As a result, the performance for the Get request deteriorates.

Therefore, it is difficult for the storage system to set the number of nodes to an appropriate value when an improvement in the performance for the Put request is needed during the initialization of data for the replica and an improvement in the performance for the Get request is needed thereafter.

SUMMARY

According to an aspect of an embodiment, a storage system having a plurality of storages. The each of the storages include a memory and a processor coupled to the memory. The processor executes a process including transmitting an update request for data which is commonly stored in the plurality of storages according to a predetermined transmission order indicating a path to transfer the update request. The process includes updating data when receiving an update request from another storage. The process includes changing the predetermined transmission order to a transmission order in which one or more storages included in the path are excluded according to the number of times the update request for the data is received.

According to another aspect of an embodiment, a storage system having a plurality of storages. The each of the storages include a memory and a processor coupled to the memory. The processor executes a process including transmitting, when receiving a read request to read data which is commonly stored in the plurality of storages, the data to a client which is a transmission source of the read request. The process includes storing the data in a specific storage which does not store the data when the number of times the read request to read the data is received is greater than a predetermined threshold value. The process includes adding the specific storage to the storage system. The process includes notifying the client that data is available to be read from the specific storage.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4A is a first diagram illustrating an example of a chain management table;

FIG. 4B is a second diagram illustrating an example of the chain management table;

FIG. 4C is a third diagram illustrating an example of the chain management table;

FIG. 5 is a diagram illustrating an example of a phantom replica management table;

FIG. 6 is a diagram illustrating an example of a temporary replica management table;

FIG. 7 is a diagram illustrating a phantom replica generation process;

FIG. 8A is a first diagram illustrating an example of the updated chain management table;

FIG. 8B is a second diagram illustrating an example of the updated chain management table;

DESCRIPTION OF EMBODIMENTS

Preferred embodiments of the present invention will be explained with reference to accompanying drawings.

[a] First Embodiment

Figure 1:
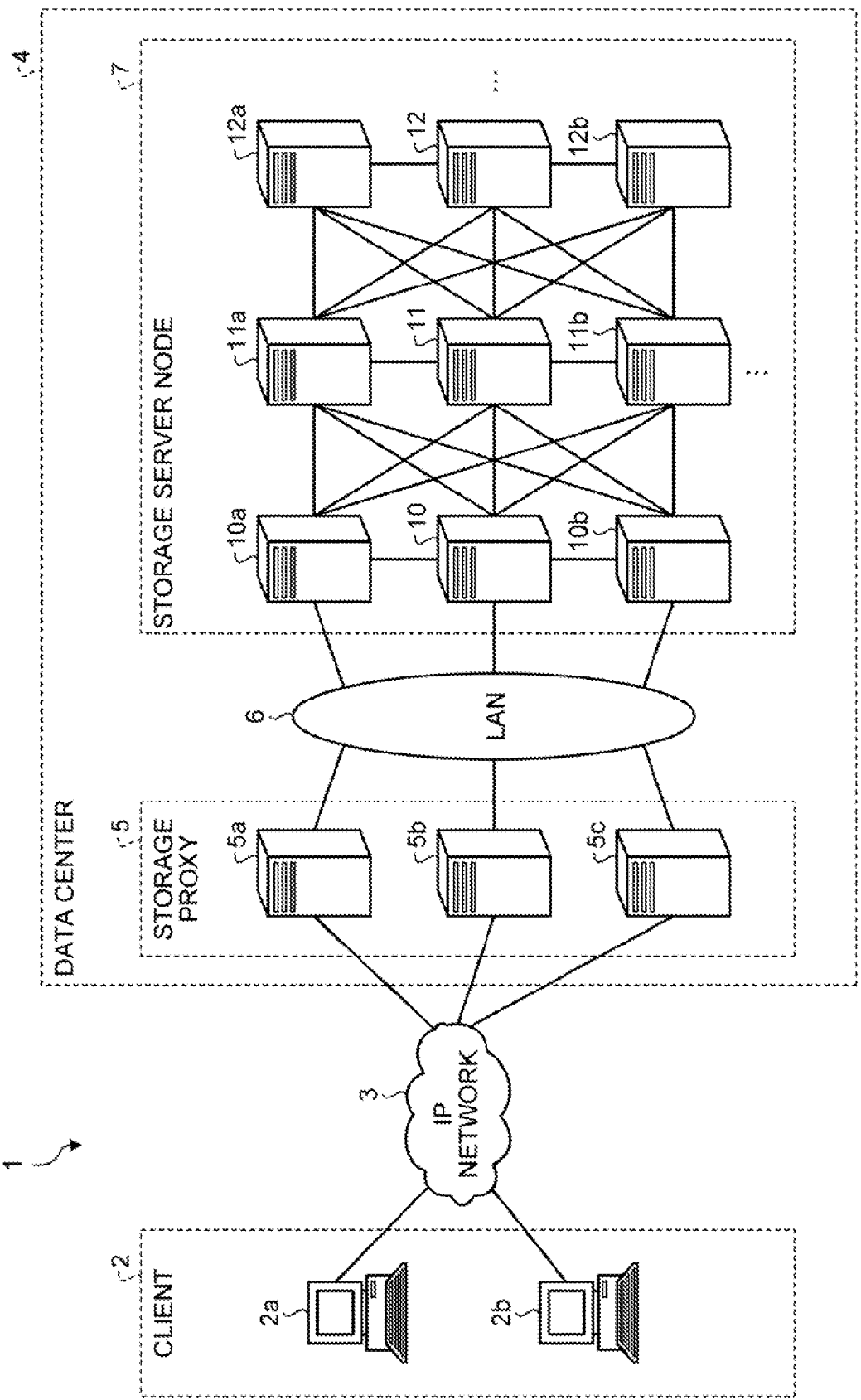
FIG. 1 is a diagram illustrating the structure of a storage system according to a first embodiment.

In the following first embodiment, an example of a storage system will be described with reference to FIG. 1. FIG. 1 is a diagram illustrating the structure of the storage system according to the first embodiment. In the example illustrated in FIG. 1, in a storage system 1, a client 2 is connected to a data center 4 through an Internet Protocol (IP) network 3. The client 2 includes a plurality of clients 2a and 2b.

The data center 4 includes a storage proxy 5, a Local Area Network (LAN) 6, and a storage server node 7. The storage proxy 5 includes a plurality of proxy servers 5a to 5c. The storage server node 7 includes a plurality of nodes 10 to 10b, 11 to 11b, and 12 to 12b. The storage server node 7 includes a plurality of other nodes. In example illustrated in FIG. 1, the nodes other than the nodes 10 to 10b, 11 to 11b, and 12 to 12b are not illustrated.

The node is, for example, a storage device, an information processing device, or a server including a memory device that stores a replica, which is a copy of data, and an arithmetic processing device that performs a process of communicating with other nodes, a data update process, and a data management process. The nodes 10 to 10b, 11 to 11b, and 12 to 12b are connected to each other such that they can communicate with each other.

Each of the nodes 10 to 10b, 11 to 11b, and 12 to 12b stores a replica, which is a copy of data. For example, the nodes 10 to 12 store replicas A1 to A3, which are copies of data A, respectively. The nodes 10a to 12a store replicas B1 to B3, which are copies of data B, respectively. The nodes 10b to 12b store replicas C1 to C3, which are copies of data C, respectively. In the following description, each of the nodes 10 to 10b, 11 to 11b, and 12 to 12b stores three replicas for one data item. However, the number of replicas is not limited to three, but an arbitrary number of replicas may be generated according to settings.

In this embodiment, it is assumed that each replica includes a first replica, a second replica, and a third replica and the node storing the first replica receives a Put request. For example, when the node 10 stores a replica A1, which is the first replica, the node 11 stores a replica A2, which is the second replica, and the node 12 stores a replica A3, which is the third replica, the node 10 receives the Put request for the data A.

The clients 2a and 2b issue the Put request to update (write) the data stored in each of the nodes 10 to 10b, 11 to 11b, and 12 to 12b or a Get request to read the data stored in each of the nodes 10 to 10b, 11 to 11b, and 12 to 12b. Then, the clients 2a and 2b transmit the issued Put request or Get request to the storage proxy 5 of the data center 4 through the IP network 3.

Each of the proxy servers 5a to 5c in the storage proxy 5 receives the Put request or the Get request from the clients 2a and 2b. In this case, each of the proxy servers 5a to 5c transmits the Put request or the Get request to each of the nodes 10 to 10b, 11 to 11b, and 12 to 12b in the storage server node 7 through the LAN 6. At that time, the proxy servers 5a to 5c perform the following processes.

That is, when the received request is the Put request, the proxy servers 5a to 5c identify the replica, which is a data update target. Then, the proxy servers 5a to 5c transmit the Put request to the node which stores the first replica of the identified replica among the nodes 10 to 10b, 11 to 11b, and 12 to 12b. For example, when receiving the Put request for the replicas A1 to A3, the proxy servers 5a to 5c transmit the Put request to the node 10 that stores the replica A1, which is the first replica.

When the received request is the Get request, the proxy servers 5a to 5c identify data corresponding to the Get request and transmit the Get request to any node which stores the replica of the identified data. For example, when receiving the Get request corresponding to the data A, the proxy servers 5a to 5c transmit the Get request to any node which stores the replicas A1 to A3 of the data A among the nodes 10 to 12.

Next, each of the nodes 10 to 10b, 11 to 11b, and 12 to 12b in the storage server node 7 will be described. Hereinafter, the process performed by the node 10 will be described, and the description of the processes of the nodes 10a, 10b, 11 to 11b, and 12 to 12b will not be repeated since the nodes 10a, 10b, 11 to 11b, and 12 to 12b have the same functions as the node 10.

When receiving the Get request, the node 10 transmits data corresponding to the Get request to the clients 2a and 2b through the LAN 6, the storage proxy 5, and the IP network 3. When receiving the Put request, the node 10 transmits an update request to update data to other nodes which store the replica of the data corresponding to the Put request.

Figure 2:
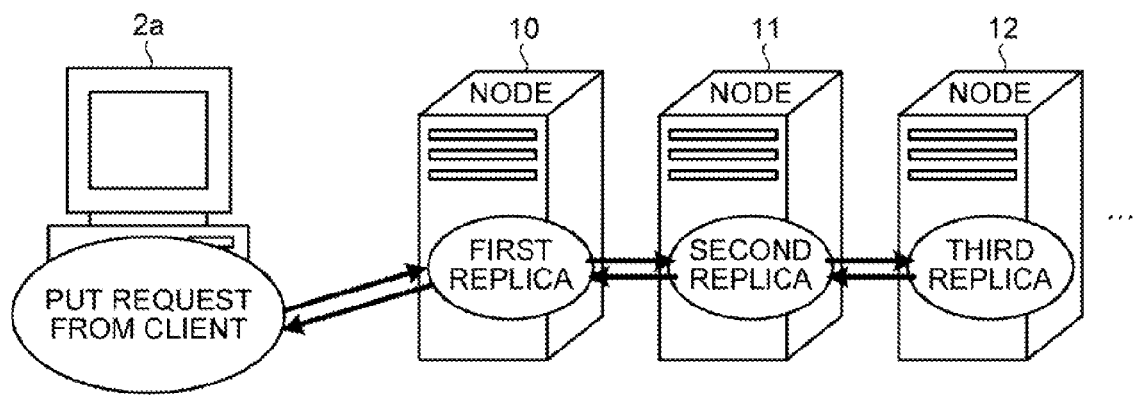
FIG. 2 is a diagram illustrating an example of a process when a node according to the first embodiment receives a Put request.

Next, an example of the process performed by the node 10 when the Put request is received will be described with reference to FIG. 2. FIG. 2 is a diagram illustrating an example of the process performed by the node according to the first embodiment when the Put request is received. For example, in the example illustrated in FIG. 2, the client 2a issues the Put request for the data A. In this case, the Put request is transmitted to the node 10 storing the replica A1, which is the first replica, among the replicas A1 to A3 of the data A.

When the Put request is acquired, the node 10 performs a process of writing the stored replica A1, which is the first replica of the data A, that is, prepares to update the replica. In addition, the node 10 determines whether the node 11 stores the second replica of the data A corresponding to the Put request. Then, the node 10 transmits an update request, which is a data update request, to the node 11.

Then, when the update request is received, the node 11 prepares to update the stored second replica and determines whether the node 12 stores the third replica of the data A corresponding to the update request. Then, the node 11 transmits the update request to the node 12.

Then, the node 12 updates the third replica and transmits an updated request, which is a response to the update request, to the node 11. When the updated request is received, the node 11 updates the prepared second replica and transmits the updated request to the node 10. When receiving the updated request, the node 10 updates the prepared first replica and transmits a Put response, which is a response to the Put request, to the client 2a.

The node 10 counts the number of Put requests received within a predetermined period of time. Then, the node 10 determines whether the counted number of Put requests, that is, an update frequency indicating the number of time data is updated is greater than a predetermined threshold value. Then, when it is determined that the update frequency is greater than the predetermined threshold value, the node 10 excludes one of the nodes 11 and 12 included in a path for transmitting the update request from the path.

For example, the node 10 excludes the node 11 as a phantom replica from the path for transmitting the update request. In this case, the node 10 transmits the update request to the node 12 and the node 12 transmits the updated request to the node 10. That is, the node 10 removes one node that transmits the update request. Therefore, it is possible to improve the performance for the Put request.

When there is a phantom replica and the update frequency is less than the predetermined threshold value, the node 10 returns the phantom replica as the original node. For example, when the node 11 is a phantom replica and the update frequency is less than the predetermined threshold value, the node 10 returns the node 11 to the path for transmitting the update request. Therefore, the node 10 can adjust the performance for the Put request according to the update frequency.

The node 10 counts the number of Get requests received within a predetermined period of time. Then, the node 10 determines whether the counted number of Get requests, that is, a reference frequency indicating the number of times data is read is greater than a predetermined threshold value. Then, when it is determined that the reference frequency is greater than the predetermined threshold value, the node 10 adds the node in which the same replica as that in the node 10 is stored.

That is, the node 10 stores the same replica of the data as that stored in the node 10 as a temporary replica in the server which does not store the same replica of the data as that stored in the node 10. Then, the node 10 notifies each of the proxy servers 5a to 5c that the Get request can be issued to the node which stores the temporary replica. Therefore, the node 10 can distribute the destinations of the Get request. As a result, it is possible to improve the performance for the Get request.

When it is determined that the reference frequency is less than the predetermined threshold value, the node 10 removes the added node. That is, the node 10 deletes the temporary replica stored in another node and notifies each of the proxy servers 5a to 5c that it is prohibited to issue the Get request to the node from which the temporary replica has been deleted. Therefore, the node 10 can adjust the performance for the Get request according to the reference frequency.

Figure 3:
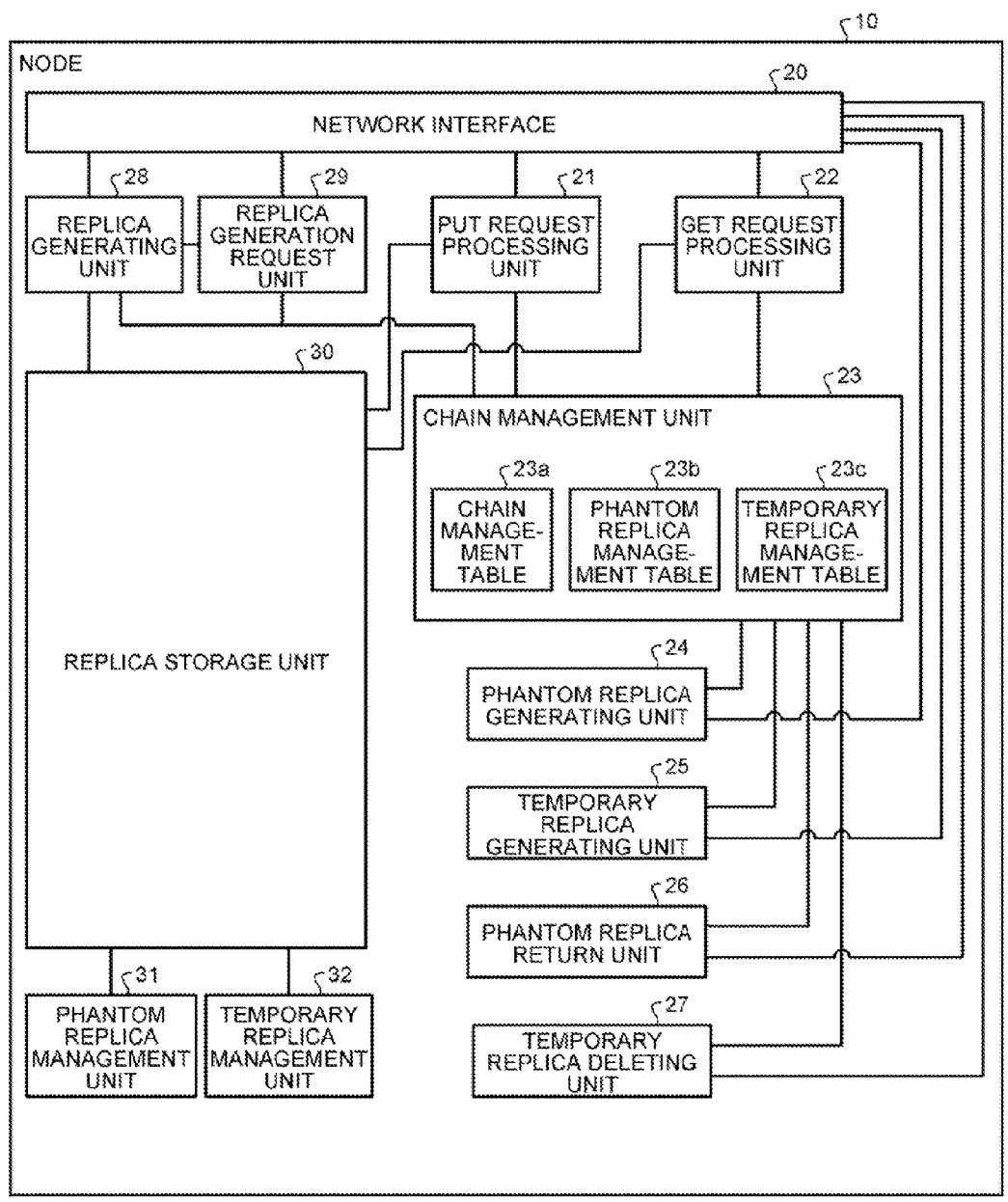
FIG. 3 is a diagram illustrating the functional structure of the node according to the first embodiment.

Next, an example of the node 10 will be described with reference to FIG. 3. FIG. 3 is a diagram illustrating the functional structure of the node according to the first embodiment. In the example illustrated in FIG. 3, the node 10 includes a network interface 20, a Put request processing unit 21, a Get request processing unit 22, a chain management unit 23, a phantom replica generating unit 24, and a temporary replica generating unit 25. In addition, the node 10 includes a phantom replica return unit 26, a temporary replica deleting unit 27, a replica generating unit 28, a replica generation request unit 29, a replica storage unit 30, a phantom replica management unit 31, and a temporary replica management unit 32.

The replica storage unit 30 is a storage unit that stores data for the replicas. For example, the replica storage unit 30 stores the replica A1, which is the first replica of the data A. In addition, the replica storage unit 30 stores a replica D3, which is the third replica of data D. As such, the replica storage unit 30 stores a plurality of replicas, which are the copies of different data items.

The chain management unit 23 includes a chain management table 23a, a phantom replica management table 23b, and a temporary replica management table 23c. The chain management table 23a stores management information about a chain, which is a path for transmitting the update request and the updated request.

Next, an example of the chain management table will be described with reference to FIG. 4A. FIG. 4A is a first diagram illustrating an example of the chain management table. For example, the chain management unit 23 of the node 10 stores the chain management table 23a illustrated in FIG. 4A. The chain management table 23a stores information in which a chain ID, a replica type, a front replica, a rear replica, an update frequency, and a reference frequency are associated with each other. The chain ID is a number for uniquely identifying the chain and a different number is set to data, which is the source of the replica.

For example, chain ID "1" is set to a chain of the replicas A1 to A3, which are the replicas of the data A, and chain ID "2" is set to a chain of the replicas B1 to B3, which are the replicas of the data B. In addition, chain ID "3" is set to a chain of the replicas C1 to C3, which are the replicas of the data C. As such, as the chain IDs, different numbers are given according to the type of data, which is the source of the replica.

The replica type is information indicating the attribute of the stored replica. For example, when the node 10 stores the replica A1, a replica type "first" is stored so as to be associated with chain ID "1". In addition, when the node 10 stores the replica B2, a replica type "second" is stored so as to be associated with chain ID "2".

The front replica is information indicating the node which stores the replica arranged on the front side, that is, the front node, which is the transmission source of the update request and the transmission destination of the updated request, in the chain indicated by the corresponding chain ID. The rear replica is information indicating the node which stores the replica arranged on the rear side, that is, the rear node, which is the transmission destination of the update request and the transmission source of the updated request, in the chain indicated by the corresponding chain ID.

The update frequency indicates the number of Put requests received within a predetermined period of time. That is, the update frequency is information indicating the number of times the replica is updated within a predetermined period of time. The reference frequency indicates the number of Get requests received within a predetermined period of time. That is, the reference frequency is information indicating the number of times the replica is read within a predetermined period of time.

For example, in the example illustrated in FIG. 4A, in the chain management table 23a, the node 10 stores the first replica A1 in the chain with chain ID "1", that is, the chain of the replicas A1 to A3 of the data A. In addition, in the chain management table 23a, the node 11 stores the replica A1. Furthermore, in the chain management table 23a, the replicas A1 to A3 of the data A are updated "four" times and the replica A1 stored in the node 10 is read "four" times within a predetermined period of time.

Next, an example of the chain management table of the node 11 and the node 12 will be described with reference to FIGS. 4B and 4C. FIG. 4B is a second diagram illustrating an example of the chain management table. FIG. 4C is a third diagram illustrating an example of the chain management table. In addition, FIG. 4B illustrates an example of the chain management table of the node 11 and FIG. 4C illustrates an example of the chain management table of the node 12.

That is, in the example illustrated in FIG. 4B, in the chain management table, the node 11 stores the second replica A2 for the chain of the replicas A1 to A3 of the data A. In addition, in the chain management table, the front node which stores the front replica A1 is the node 10 and the rear node which stores the rear replica A3 is the node 12. In the chain management table, the replicas A1 to A3 of the data A are updated "4" times and the replica A2 stored in the node 11 is read "7" times within a predetermined period of time.

In the example illustrated in FIG. 4C, in the chain management table, the node 12 stores the third replica A3 for the chain of the replicas A1 to A3 of the data A. In addition, in the chain management table, the front node which stores the front replica A2 is the node 11. In the chain management table, the replicas A1 to A3 of the data A are updated "4" times and the replica A3 stored in the node 12 is read "9" times within a predetermined period of time.

Returning to FIG. 3, the phantom replica management table 23b is phantom replica management information set by the node 10. In addition, the temporary replica management table 23c is temporary replica management information set by the node 10. Next, an example of the phantom replica management table 23b and the temporary replica management table 23c will be described with reference to FIGS. 5 and 6.

First, an example of the phantom replica management table 23b will be described with reference to FIG. 5. FIG. 5 is a diagram illustrating an example of the phantom replica management table. In the example illustrated in FIG. 5, a chain ID, a node which stores the phantom replica, and update data are stored in the phantom replica management table 23b so as to be associated with each other.

The update data is information indicating an update process which has not been applied to the phantom replica and is, for example, difference data generated by the execution of the update process. That is, when receiving the Put request, the node 10 does not transmit the update request to the phantom replica. The node 10 generates the difference data before and after update due to the update request whenever the Put request is received and stores the generated difference data as the update data. That is, in the example illustrated in FIG. 5, in the phantom replica management table 23b, the node 11 is a phantom replica and there are a plurality of update data items, that is, update 1, update 2, etc.

Next, an example of the temporary replica management table 23c will be described with reference to FIG. 6. FIG. 6 is a diagram illustrating an example of the temporary replica management table. As illustrated in FIG. 6, a chain ID and a node having a temporary replica set therein are stored in the temporary replica management table 23c so as to be associated with each other. That is, in the example illustrated in FIG. 6, in the temporary replica management table 23c, the temporary replica corresponding to chain ID "1", that is, the temporary replica of the data A is set in the node 11a and the node 11b.

Returning to FIG. 3, the network interface 20 is connected to the LAN 6 and receives the Put request or the Get request transmitted from each of the proxy servers 5a to 5b. In addition, the network interface 20 transmits a Put response or replica data to each of the proxy servers 5a to 5b. The network interface 20 transmits and receives the update request or the updated request to and from each of the nodes 10a, 10b, 11 to 11b, and 12 to 12b in the storage server node 7.

The network interface 20 transmits and receives requests for a replica generation process or a replica deletion process to and from each of the nodes 10a, 10b, 11 to 11b, and 12 to 12b. In the example illustrated in FIG. 3, for simplicity of illustration, the connection among the network interface 20, the LAN 6, and each of the nodes 10a, 10b, 11 to 11b, and 12 to 12b is not illustrated.

When the Put request is received, the Put request processing unit 21 updates the replica. Specifically, when the Put request is received through the network interface 20, the Put request processing unit 21 searches for the replica which updates data corresponding to the Put request from the replica storage unit 30 and prepares to update the searched replica.

The Put request processing unit 21 increases the update frequency which is stored so as to be associated with the chain of the replica corresponding to the Put request in the chain management table 23a by one. Then, the Put request processing unit 21 identifies the rear node which is stored so as to be associated with the chain that updates the replica corresponding to the Put request from the chain management table 23a. Then, the Put request processing unit 21 transmits the update request to the identified rear node.

When the updated request related to the chain including the front node which is not stored in the chain management table 23a is received, that is, when the node 10 is the first node of the identified chain, the Put request processing unit 21 performs the following process. That is, the Put request processing unit 21 applies the prepared update and transmits the Put response to the client that has issued the Put request.

When the node storing the phantom replica is stored in the phantom replica management table 23b so as to be associated with the chain of the replica corresponding to the Put request, the Put request processing unit 21 generates difference data using an update process. Then, the Put request processing unit 21 stores the generated difference data as update data in the phantom replica management table 23b.

When the update request is received, the Put request processing unit 21 removes the node storing the temporary replica which is stored so as to be associated with the chain of the replica corresponding to the update request, with reference to the temporary replica management table 23c. This process enables the node 10 to prevent the deterioration of the performance caused when the replica is updated. The Put request processing unit 21 updates the update frequency in the chain management table 23a to zero at a predetermined time interval, separately from the above-mentioned process.

The Get request processing unit 22 transmits data for the replica corresponding to the Get request to the client that has issued the Get request. Specifically, when the Get request is received through the network interface 20, the Get request processing unit 22 searches for the replica corresponding to the Get request from the replica storage unit 30. Then, the Get request processing unit 22 transmits data for the searched replica to the client that has issued the Get request.

When the Get request is received, the Get request processing unit 22 increases the reference frequency which is stored in the chain management table 23a so as to be associated with the chain of the replica corresponding to the Get request by one. In addition, the Get request processing unit 22 updates the reference frequency in the chain management table 23a to zero at a predetermined time interval.

The phantom replica generating unit 24 determines whether the update frequency stored in the chain management table 23a is greater than a predetermined threshold value. When it is determined that the update frequency is greater than the predetermined threshold value, the phantom replica generating unit 24 excludes the rear node which is stored so as to be associated with the update frequency that is greater than the predetermined threshold value as the phantom replica from the chain.

Specifically, the phantom replica generating unit 24 determines whether the update frequency of the chain which is a start point is greater than a predetermined threshold value with reference to the chain management table 23a. When it is determined that the update frequency of the chain which is a start point is greater than the predetermined threshold value, the phantom replica generating unit 24 performs the following process. That is, for the chain whose update frequency is determined to be greater than the predetermined threshold value, the phantom replica generating unit 24 notifies information indicating that the replica is used as the phantom replica and the chain ID to the node which is stored as the rear node.

In this case, the node 10 is notified of the information indicating that the replica is used as the phantom replica and the chain ID. Then, the phantom replica generating unit 24 changes the rear node to the notified node for the chain whose update frequency is determined to be greater than the predetermined threshold value in the chain management table 23a. In addition, the phantom replica generating unit 24 stores the node which stores the phantom replica and the chain ID in the phantom replica management table 23b so as to be associated with each other.

That is, when the update frequency is greater than the predetermined threshold value, the phantom replica generating unit 24 temporarily excludes the replica included in the chain which transmits the update request as the phantom replica. Therefore, in the storage system 1, the number of nodes on the path for transmitting the update request is reduced. As a result, it is possible to improve the performance for the Put request.

The temporary replica generating unit 25 determines whether the reference frequency is greater than a predetermined threshold value for each chain with reference to the chain management table 23a. Then, when it is determined that the reference frequency is greater than the predetermined threshold value for any chain, the temporary replica generating unit 25 performs the following process. That is, the temporary replica generating unit 25 searches for an available node from the storage server node 7. The available node is, for example, a node in which there is a margin, for example, in memory resources, disk capacity, and CPU (Central Processing Unit) resources or a node which is installed close to the node 10.

The temporary replica generating unit 25 stores the replica related to the chain whose reference frequency is determined to be greater than the predetermined threshold value as the temporary replica in the searched available node. Specifically, the temporary replica generating unit 25 transmits data for the replica related to the chain whose reference frequency is determined to be greater than the predetermined threshold value to the searched node and also transmits a temporary replica generation request.

The temporary replica generating unit 25 stores the chain ID related to the copied replica and the node which stores the temporary replica in the temporary replica management table 23c so as to be associated with each other. In addition, the temporary replica generating unit 25 notifies the proxy servers 5a to 5c that data can be read from the node storing the temporary replica.

That is, when it is determined that the reference frequency is greater than a predetermined threshold value for the replica stored in the node 10, the temporary replica generating unit 25 generates a temporary replica, which is a copy of the replica stored in the node 10, in another node. The temporary replica is not added to the chain and is not updated in response to, for example, the update request. Therefore, the node 10 can improve the performance of the Get request, without deteriorating the performance for the Put request.

When there is a phantom replica and it is determined that the update frequency is less than the predetermined threshold value, the phantom replica return unit 26 returns the phantom replica to a normal replica. Specifically, the phantom replica return unit 26 identifies the chain ID which is stored so as to be associated with the node storing the phantom replica with reference to the phantom replica management table 23b. Then, the phantom replica return unit 26 determines whether the update frequency of the identified chain ID is less than a predetermined threshold value with reference to the chain management table 23a.

When it is determined that the update frequency is less than the predetermined threshold value, the phantom replica return unit 26 performs the following process using the phantom replica management table 23b. That is, the phantom replica return unit 26 identifies the node storing the phantom replica which is stored so as to be associated with the chain ID of the chain whose update frequency has been determined to be less than the predetermined threshold value. Then, the phantom replica return unit 26 transmits the update data stored in the phantom replica management table 23b to the identified node and instructs the node to apply the update data to the phantom replica.

In addition, the phantom replica return unit 26 identifies the rear node of the chain whose update frequency has been determined to be less than the predetermined threshold value with reference to the chain management table 23a. Then, the phantom replica return unit 26 notifies the identified node to the node which stores the phantom replica and notifies information indicating the return of the phantom replica, the chain ID, and information indicating a replica with a number that is one greater than the number of its own replica. In addition, the phantom replica return unit 26 changes the rear node identified from the chain management table 23a to the node identified from the phantom replica management table 23b.

That is, when there is a phantom replica and the update frequency is less than the predetermined threshold value, the phantom replica return unit 26 returns the phantom replica. Therefore, when the update frequency is small, the number of nodes storing the replica returns to the original value. As a result, the node 10 can adjust the performance for the Put request.

The phantom replica return unit 26 applies the update data generated by the Put request processing unit 21 to the phantom replica and then returns the phantom replica as a normal replica to the chain. Therefore, the node 10 can adjust the performance for the Put request while maintaining the identity of each replica. In addition, the node 10 returns the phantom replica to which the update data, which is update difference data, is applied to the chain, without generating a new replica. Therefore, it is possible to rapidly return the replica.

When there is a temporary replica and it is determined that the reference frequency is less than the predetermined threshold value, the temporary replica deleting unit 27 deletes the temporary replica. Specifically, the temporary replica deleting unit 27 identifies the chain ID corresponding to the node which stores the temporary replica, with reference to the temporary replica management table 23c. Then, the temporary replica deleting unit 27 determines whether the reference frequency is less than a predetermined threshold value for the identified chain ID with reference to the chain management table 23a.

When it is determined that the reference frequency is less than the predetermined threshold value for the identified chain ID, the temporary replica deleting unit 27 performs the following process. That is, the temporary replica deleting unit 27 deletes the node storing the temporary replica which is stored so as to be associated with the chain ID whose reference frequency has been determined to be less than the predetermined threshold value, with reference to the temporary replica management table 23c. In addition, the temporary replica deleting unit 27 notifies each of the proxy servers 5a to 5c that it is prohibited to read data from the node deleted from the temporary replica management table 23c.

That is, when there is a temporary replica and the reference frequency is less than the predetermined threshold value, the temporary replica deleting unit 27 deletes the temporary replica. Therefore, the node 10 can adjust the performance for the Get request without deteriorating the performance for the Put request.

When the generation of the normal replica is requested by, for example, an update request, the replica generating unit 28 generates a replica and stores the replica in the replica storage unit 30. Specifically, when the update request is received from another node, the replica generating unit 28 searches for the replica to be updated from the replica storage unit 30 and prepares to update the searched replica. In addition, when the replica corresponding to the update request is not stored in the replica storage unit 30, the replica generating unit 28 prepares to store a new replica.

When the node 10 is not the last node in the chain of the replica corresponding to the update request, the replica generating unit 28 instructs the replica generation request unit 29 to transmit the update request. When the rear node is not stored in the chain management table 23a, that is, when the node 10 is the last node in the identified chain, the replica generating unit 28 performs the following process.

That is, the replica generating unit 28 updates the replica or stores a new replica in the replica storage unit 30. In addition, the replica generating unit 28 transmits the updated request to the front node which is stored in the chain management table 23a so as to be associated with the identified chain. If the updated request is received from another node, the replica generating unit 28 applies the prepared update when the update request is received. In addition, the replica generating unit 28 identifies the chain of the replica corresponding to the updated request and transmits the updated request to the front node which is stored in the chain management table 23a so as to be associated with the identified chain.

When a notice indicating that the replica is used as the phantom replica is acquired from another node, the replica generating unit 28 uses the replica stored in the replica storage unit 30 as the phantom replica. Specifically, the replica generating unit 28 receives a notice indicating that the replica is used as the phantom replica and the chain ID from another node.

In this case, the replica generating unit 28 notifies the rear node corresponding to the notified chain ID to the front node which is stored so as to be associated with the identified chain ID, that is, the node which is the source of the notice indicating the phantom replica. In addition, the replica generating unit 28 notifies the front node which is stored so as to be associated with the chain ID and the identified chain ID to the rear node which is stored so as to be associated with the notified chain ID, with reference to the chain management table 23a, and also notifies that the node is excluded from the chain. Furthermore, the replica generating unit 28 changes the replica type of the identified chain ID to the phantom replica in the chain management table 23a.

When receiving the node, the chain ID, and the notice indicating the exclusion of the node from the chain from another node, the replica generating unit 28 performs the following process. That is, the replica generating unit 28 changes the front node which is stored so as to be associated with the notified chain ID to the notified node, with reference to the chain management table 23a. That is, the replica generating unit 28 identifies the replica stored in the front node as the phantom replica and excludes the phantom replica from the chain. Therefore, a node in front of the front node is used as a new front node.

When a notice indicating the return of the phantom replica is received from another node, the replica generating unit 28 returns the phantom replica to the chain. Specifically, the replica generating unit 28 receives the notice indicating the return of the phantom replica, a notice of the node, the chain ID, and a replica type indicating a replica number from another node. In this case, the replica generating unit 28 changes the front node of the chain related to the phantom replica to the node, which is the source of the notice, and changes the rear node of the chain related to the phantom replica to the notified node in the chain management table 23*a*. In addition, the replica generating unit 28 changes the replica type corresponding to the notified chain ID to the notified replica type in the chain management table 23*a*.

Then, the replica generating unit 28 notifies the chain ID related to the phantom replica and a change in the front node to the node notified by another node, that is, a new rear node. When receiving the chain ID and a notice indicating the change in the front node from another node, the replica generating unit 28 identifies the chain ID notified by the chain management table 23*a* and changes the front node which is stored so as to be associated with the identified chain ID to the notified node.

When a request to generate a temporary replica is received from another node, the replica generating unit 28 stores the temporary replica in the replica storage unit 30. Specifically, the replica generating unit 28 receives data for the replica and the request to generate the temporary replica. In this case, the replica generating unit 28 stores the received data for the replica as the temporary replica in the replica storage unit 30.

When an instruction to transmit the update request is received from the replica generating unit 28, the replica generation request unit 29 identifies the rear node, which is the transmission destination of the update request, with reference to the chain management table 23*a*. Then, the replica generation request unit 29 transmits the update request to the identified rear node.

The phantom replica management unit 31 manages the phantom replica stored in the replica storage unit 30. For example, when the resources of the node 10 are depleted, the phantom replica management unit 31 deletes the phantom replica stored in the replica storage unit 30. In particular, the phantom replica management unit 31 deletes the phantom replica, for example, when the capacity of the replica storage unit 30 or the memory is insufficient and it is difficult to store the phantom replica, or when the CPU resources are insufficient and a response deteriorates. In addition, when the phantom replica is deleted, the phantom replica management unit 31 may notify the front node of the chain including the phantom replica that the phantom replica has been deleted.

The temporary replica management unit 32 manages the temporary replica stored in the replica storage unit 30. For example, when the resources of the node 10 are depleted, the temporary replica management unit 32 deletes the temporary replica stored in the replica storage unit 30. When the resources are depleted and the temporary replica is deleted, the temporary replica management unit 32 may notify the proxy servers 5*a* to 5*c* that it is prohibited to read data.

For example, the network interface 20, the Put request processing unit 21, the Get request processing unit 22, the phantom replica generating unit 24, the temporary replica generating unit 25, the phantom replica return unit 26, and the temporary replica deleting unit 27 are electronic circuits. In addition, the replica generating unit 28, the replica generation request unit 29, the phantom replica management unit 31, and the temporary replica management unit 32 are electronic circuits. Examples of the electronic circuit include an integrated circuit, such as an Application Specific Integrated Circuit (ASIC) or an Field programmable Gate Array (FPGA), a Central Processing Unit (CPU), and an Micro Processing Unit (MPU).

Each of the chain management unit 23 and the replica storage unit 30 is a semiconductor memory device, such as a Random Access Memory (RAM), a Read Only Memory (ROM), or a flash memory, or a storage device, such as a hard disk or an optical disk.

Next, an example of the phantom replica generation process of the node 10 will be described with reference to FIG. 7. FIG. 7 is a diagram illustrating the phantom replica generation process. For example, in the example illustrated in FIG. 7, the node 10 stores the first replica of the data A, the node 11 stores the second replica of the data A, and the node 12 stores the third replica of the data A. It is assumed that the nodes illustrated in FIG. 7 are connected to the chain with chain ID "1" in which the node 10, the node 11, and the node 12 are chained in this order.

For example, it is assumed that, when the update frequency of the Put request corresponding to the replica of the data A is greater than a predetermined threshold value, the node 10 uses the second replica stored in the node 11 as the phantom replica. Specifically, as represented by (F) in FIG. 7, the node 10 notifies the node 11, which is the rear node, of information indicating that the second replica is used as the phantom replica and chain ID "1".

In this case, the node 11 notifies the node 10 that the node 12 is the rear node, in the chain with chain ID "1". Then, the node 10 changes the node 11, which is the rear node, to the notified node 12 in the chain with chain ID "1".

As represented by (G) in FIG. 7, the node 11 notifies the node 12 that the node 10 is the front node, and notifies the node 12 of removal from the chain with chain ID "1". Then, the node 12 changes the front node from the node 11 to the node 10 in the chain with chain ID "1". Therefore, when the Put request is received, the node 10 transmits the update request to the node 12, not the node 11, as represented by (H) in FIG. 7.

Next, a chain management table update process of the node 10 and the node 12 in the example illustrated in FIG. 7 will be described with reference to FIGS. 8A and 8B. FIG. 8A is a first diagram illustrating an example of the updated chain management table. FIG. 8B is a second diagram illustrating an example of the updated chain management table. FIG. 8A illustrates the updated chain management table 23*a* of the node 10 and FIG. 8B illustrates the update chain management table 23*a* of the node 12.

As described above, when the second replica of the node 11 is the phantom replica, the node 10 receives a notice indicating that the node 12 is the rear node of the node 11 from the node 11. Therefore, as illustrated in FIG. 8A, the node 10 changes the rear replica from the node 11 to the node 12. As a result, the node 10 transmits the update request to the node 12.

When the second replica of the node 11 is the phantom replica, the node 12 receives a notice indicating that the node 10 is the front replica of the node 11 from the node 11. Therefore, as illustrated in FIG. 8B, the node 12 changes the front replica from the node 11 to the node 10. As a result, the node 12 transmits the updated request to the node 10.

Figure 9:
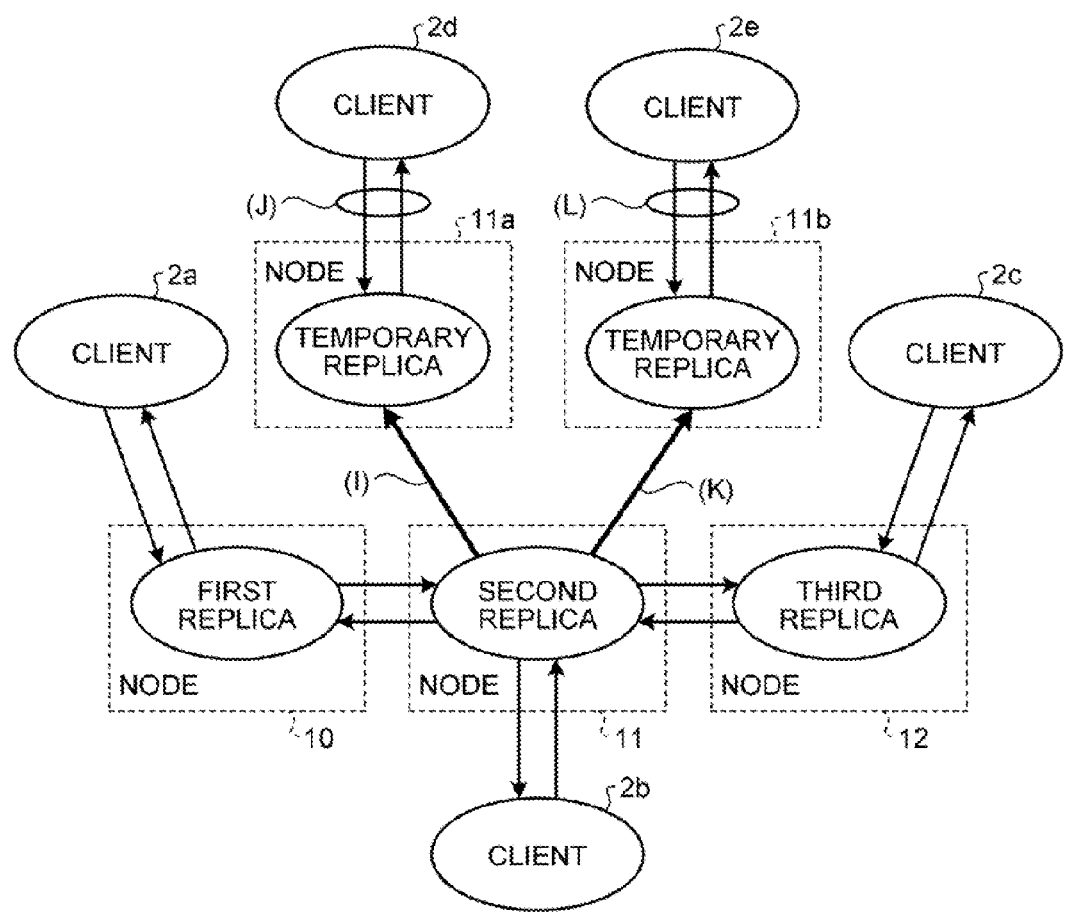
FIG. 9 is a diagram illustrating a temporary replica generation process.

Next, an example of the temporary replica generation process of the node 11 storing the second replica will be described with reference to FIG. 9. FIG. 9 is a diagram illustrating the temporary replica generation process. In the example illustrated in FIG. 9, the nodes 10 to 12 store the same replicas as those illustrated in FIG. 7.

For example, in the example illustrated in FIG. 9, the node 10 receives the Get request from the client 2a. The node 11 receives the Get request from the client 2b. The node 12 receives the Get request from the client 2c. When it is determined that the reference frequency is greater than the predetermined threshold value, the node 11 detects a node 11a as a new node.

In this case, as represented by (I) in FIG. 9, the node 11 generates a temporary replica, which is a copy of the second replica, in the node 11a. Therefore, as represented by (J) in FIG. 9, the node 11a performs a process corresponding to the Get request issued by the client 2d.

When it is determined that the reference frequency is greater than the predetermined threshold value again after the temporary replica is generated in the node 11a, the node 11 detects a node 11b as a new node. As represented by (K) in FIG. 9, the node 11 generates a temporary replica in the node 11b. Therefore, as represented by (L) in FIG. 9, the node 11b performs a process corresponding to the Get request issued by the client 2e.

Next, the flow of the process performed by the node 10 will be described with reference to FIGS. 10A to 10C, FIG. 11A, FIG. 11B, and FIG. 12. It is assumed that the node 10 independently performs the processes illustrated in FIGS. 10A to 10C, FIG. 11A, FIG. 11B, and FIG. 12.

Figure 10A:
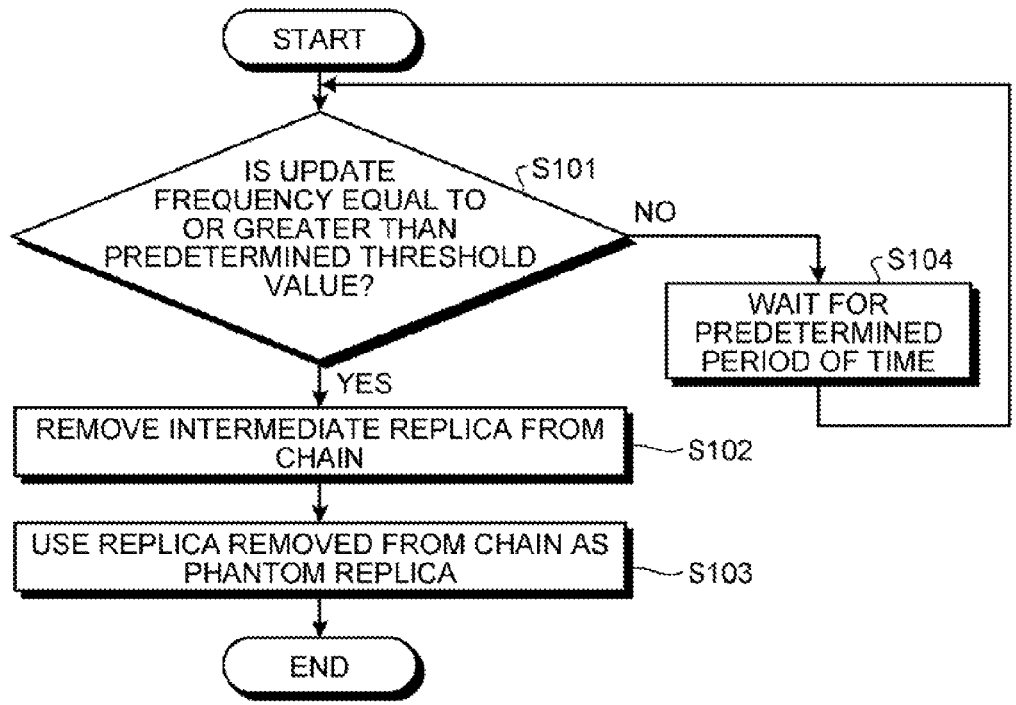
FIG. 10A is a flowchart illustrating the flow of a phantom replica setting process.

First, an example of the phantom replica setting process of the node 10 will be described with FIG. 10A. FIG. 10A is a flowchart illustrating the flow of the phantom replica setting process. For example, the node 10 determines whether the update frequency is equal to or greater than a predetermined threshold value (Step S101).

When it is determined that the update frequency is equal to or greater than the predetermined threshold value (Yes in Step S101), the node 10 updates the chain management table 23a and removes an intermediate replica of the chain from the chain (Step S102). Then, the node 10 registers the replica removed from the chain in the phantom replica management table 23b and uses the replica as a phantom replica (Step S103). Then, the node 10 ends the process. On the other hand, when it is determined that the update frequency is less than the predetermined threshold value (No in Step S101), the node 10 waits for a predetermined period of time (Step S104). Then, the node 10 determines whether the update frequency is equal to or greater than the predetermined threshold value again (Step S101).

Figure 10B:
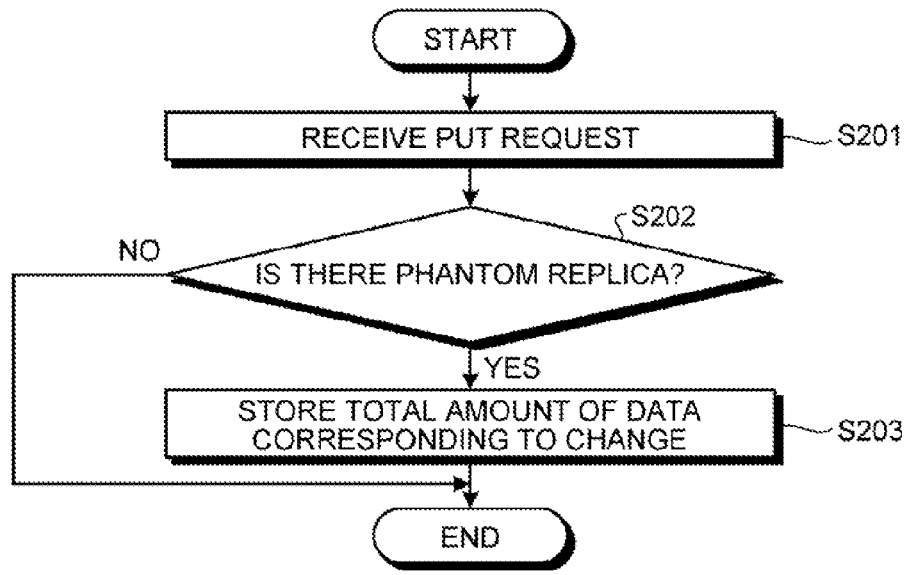
FIG. 10B is a flowchart illustrating the flow of a process of storing the total amount of data.

Next, the flow of an update data storage process of the node 10 when there is a phantom replica will be described with reference to FIG. 10B. FIG. 10B is a flowchart illustrating a process of storing the total amount of data. For example, in the example illustrated in FIG. 10B, the node 10 receives the Put request issued by the client 2 (Step S201). In this case, the node 10 determines whether there is a phantom replica in the chain of the replicas corresponding to the Put request (Step S202).

When it is determined that there is a phantom replica (Yes in Step S202), the node 10 performs the following process. That is, the node 10 prepares to update its replica and stores the total amount of changed data, that is, the total amount of difference data before and after update (Step S203) and ends the process. When it is determined that there is no phantom replica (No in Step S202), the node 10 ends the process without storing the total amount of difference data.

Figure 10C:
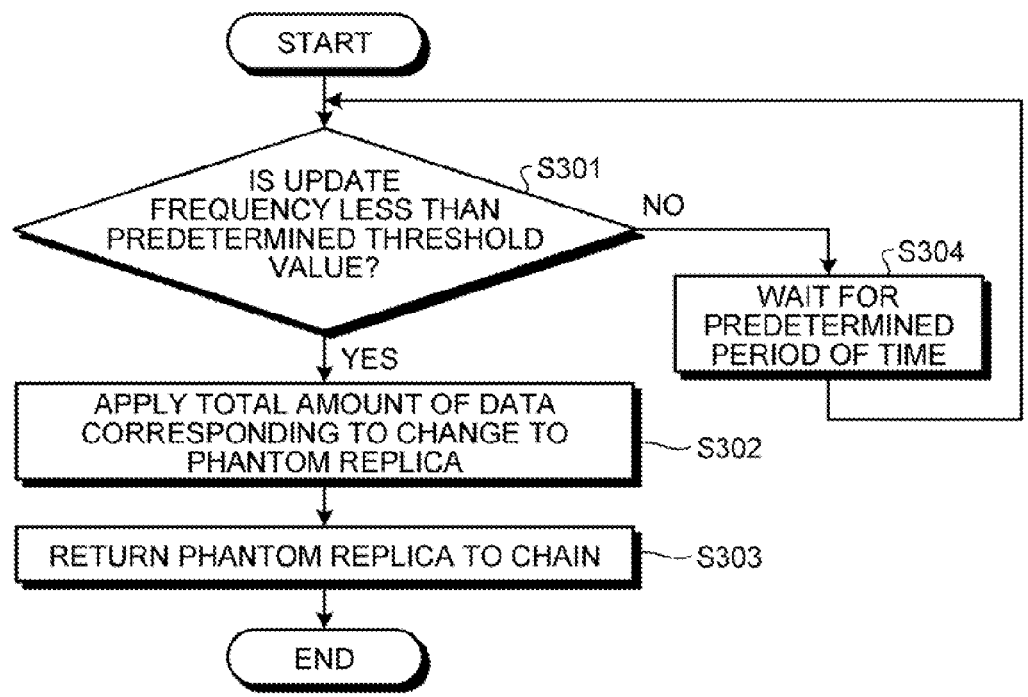
FIG. 10C is a flowchart illustrating the flow of a phantom replica return process.

Next, the flow of a phantom replica return process of the node 10 will be described with reference to FIG. 10C. FIG. 10C is a flowchart illustrating the flow of the phantom replica return process. For example, in the example illustrated in FIG. 10C, the node 10 determines whether the update frequency is less than a predetermined threshold value (Step S301).

When it is determined that the update frequency is less than the predetermined threshold value (Yes in Step S301), the node 10 applies the total amount of changed data to the phantom replica (Step S302). Then, the node 10 changes the rear node to the node storing the phantom replica in the chain management table 23a, thereby returning the phantom replica to the chain (Step S303), and ends the process. On the other hand, when it is determined that the update frequency is equal to or greater than the predetermined threshold value (No in Step S301), the node 10 waits for a predetermined period of time (Step S304) and determines whether the update frequency is less than the predetermined threshold value again (Step S301).

Figure 11A:
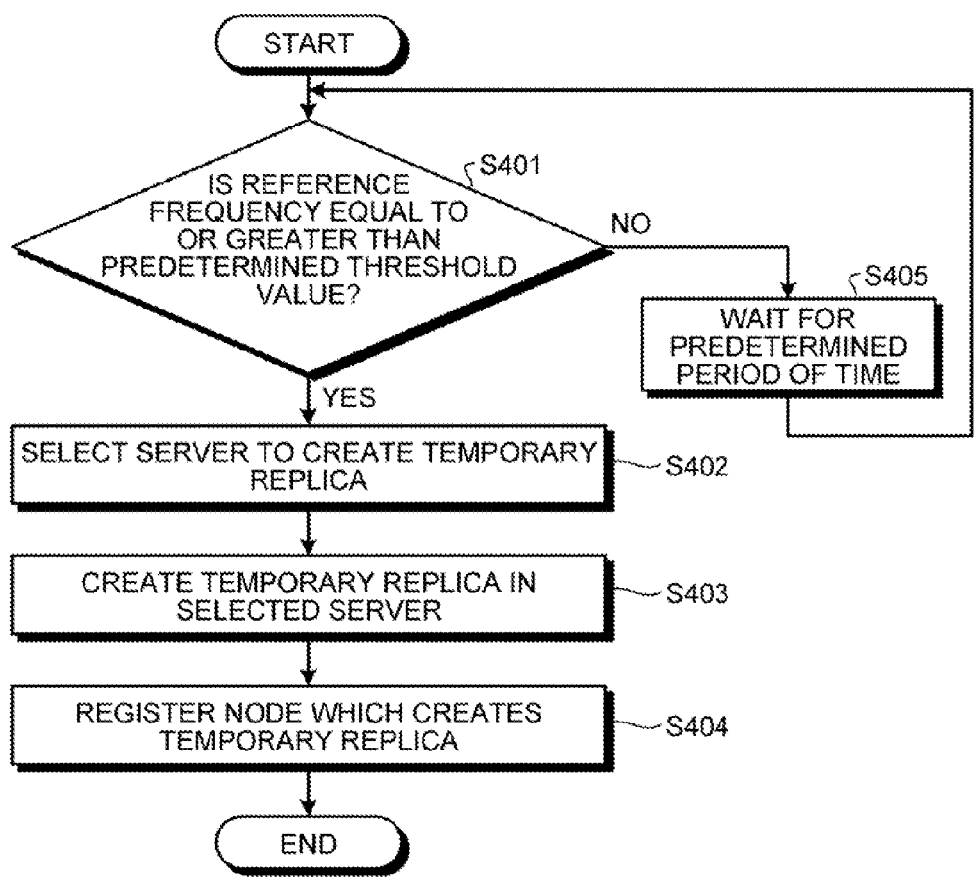
FIG. 11A is a flowchart illustrating the flow of a temporary replica creation process.

Next, an example of a temporary replica creation process of the node 10 will be described with reference to FIG. 11A. FIG. 11A is a flowchart illustrating the flow of the temporary replica creation process. For example, in the example illustrated in FIG. 11A, the node 10 determines whether the reference frequency is equal to or greater than a predetermined threshold value (Step S401).

When it is determined that the reference frequency is equal to or greater than the predetermined threshold value (Yes in Step S401), the node 10 selects a server to create a temporary replica (Step S402). Then, the node 10 creates the temporary replica in the selected server (Step S403) and registers the node which creates the temporary replica in the proxy servers 5a to 5c (Step S404). On the other hand, when it is determined that the reference frequency is less than the predetermined threshold value (No in Step S401), the node 10 waits for a predetermined period of time (Step S405) and determines whether the reference frequency is equal to or greater than the predetermined threshold value again (Step S401).

Figure 11B:
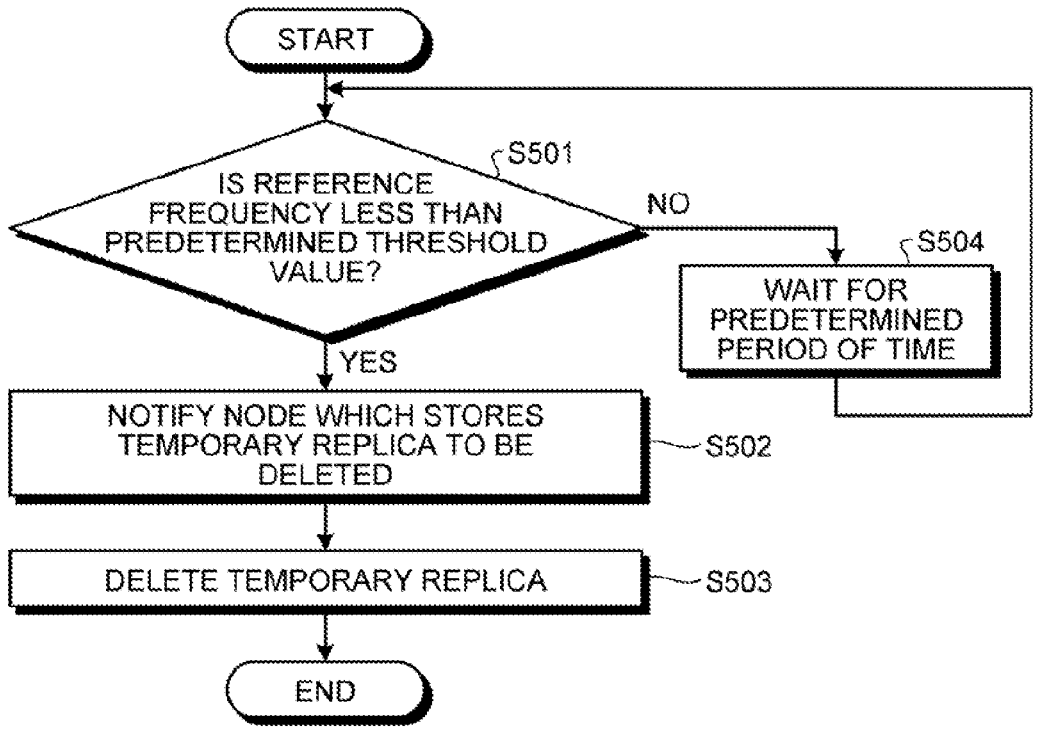
FIG. 11B is a flowchart illustrating the flow of a temporary replica deletion process.

Next, an example of the flow of a temporary replica deletion process of the node 10 will be described with reference to FIG. 11B. FIG. 11B is a flowchart illustrating the flow of the temporary replica deletion process. For example, in the example illustrated in FIG. 11B, the node 10 determines whether the reference frequency is less than a predetermined threshold value (Step S501).

When it is determined that the reference frequency is less than the predetermined threshold value (Yes in Step S501), the node 10 notifies the proxy servers 5a to 5c of the node which stores the temporary replica to be deleted (Step S502). Then, the node 10 deletes the temporary replica (Step S503) and ends the process. On the other hand, when it is determined that the reference frequency is equal to or greater than the predetermined threshold value (No in Step S501), the node 10 waits for a predetermined period of time (Step S504) and determines whether the reference frequency is less than the predetermined threshold value again (Step S501).

Figure 12:
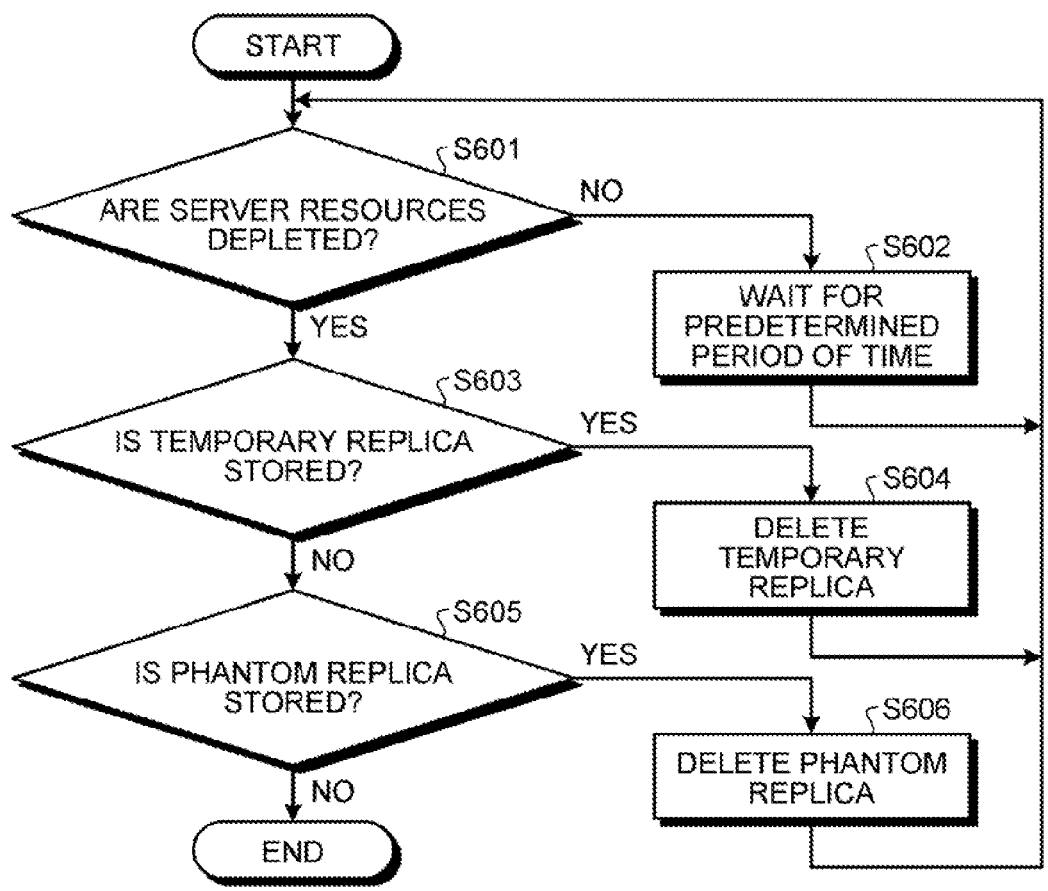
FIG. 12 is a flowchart illustrating the flow of a replica deletion process.

Next, an example of the flow a phantom replica or temporary replica deletion process of the node 10 will be described with reference to FIG. 12. FIG. 12 is a flowchart illustrating the flow of a replica deletion process. For example, in the example illustrated in FIG. 12, the node 10 determines whether its resources are depleted (Step S601).

When it is determined that the resources of the node 10 are not depleted (No in Step S601), the node 10 waits for a predetermined period of time (Step S602) and determines whether its resources are depleted again (Step S601). On the other hand, when it is determined that the resources of the node 10 are depleted (Yes in Step S601), the node 10 determines whether a temporary replica is stored (Step S603).

When it is determined that the temporary replica is stored (Yes in Step S603), the node 10 deletes the stored temporary replica (Step S604). Then, the node 10 determines whether its resources are depleted again (Step S601).

On the other hand, when it is determined that the temporary replica is not stored (No in Step S603), the node 10 determines whether the phantom replica is stored (Step S605). When it is determined that a phantom replica is stored (Yes in Step S605), the node 10 deletes the phantom replica (Step S606) and determines whether its resources are depleted again (Step S601). When it is determined that the phantom replica is not stored (No in Step S605), the node 10 ends the process.

Effect of First Embodiment

As described above, when receiving the Put request for the data which is commonly stored in the plurality of nodes 10 to 12, the storage system 1 transmits the Put request for the data among the plurality of nodes 10 to 12 in a predetermined transmission order, thereby performing a data update process in each of the nodes 10 to 12, which are the transmission destinations of the Put request. The storage system 1 performs control such that the predetermined transmission order is changed to a transmission order in which one or more nodes included in the transmission destinations in the transmission in the predetermined transmission order are excluded as phantom replicas from the transmission destinations and the Put request for the data is transmitted, according to the number of times the Put request for data is received.

For example, the first node 10 in the chain determines whether the update frequency, which is the number of Put requests received within a predetermined period of time, is greater than a predetermined threshold value. When it is determined that the update frequency is greater than the predetermined threshold value, the node 10 excludes the node 11, which is the rear node, as a phantom replica from the chain. Therefore, the storage system 1 including the node 10 can dynamically adjust the performance for the Put request.

When there is a phantom replica and the reception frequency of the Put request for the data is less than a predetermined threshold value, the storage system 1 performs control such that the Put request for the data is transmitted in the transmission order in which the phantom replica returns to the path. For example, when there is a phantom replica and it is determined that the update frequency is less than a predetermined threshold value, the node 10 returns the phantom replica as a normal replica to the chain. Therefore, the storage system 1 can dynamically adjust the performance for the Put request.

When there is a phantom replica and the Put request is received, the storage system 1 stores difference data. When there is a phantom replica and the reception frequency of the Put request for the data is less than the predetermined threshold value, the storage system 1 applies the difference data to the phantom replica. Then, the storage system 1 performs control such that the Put request is transmitted in the transmission order to which the phantom replica returns.

For example, when there is a phantom replica and the Put request is received, the node 10 stores the total amount of changed data, that is, difference data. When it is determined that the update frequency is less than the predetermined threshold value, the node 10 applies the stored difference data to the phantom replica and returns the phantom replica as a normal replica to the chain. Therefore, the storage system 1 can rapidly return the phantom replica as a normal replica.

When the reception frequency of the Get request is greater than a predetermined threshold value, the storage system 1 stores data in the node without any data and the node is added as a node storing a temporary replica to the storage system 1. Then, the storage system 1 notifies the proxy servers 5a to 5c that data can be read from the node storing the temporary replica.

For example, the node 10 determines whether the reference frequency, which is the number of times the Get request is received within a predetermined period of time, is greater than a predetermined threshold value. When it is determined that the reference frequency is greater than the predetermined threshold value, the node 10 stores the same stored replica as that stored in the node 10 as a temporary replica in another node. Then, the node 10 notifies the proxy servers 5a to 5c that data can be read from the node storing the temporary replica. Therefore, the node 10 can dynamically adjust the performance for the Get request.

When there is a node storing the temporary replica and the reception frequency of the Get request is less than the predetermined threshold value, the node storing the temporary replica is excluded from the storage system 1. In addition, the storage system 1 notifies the proxy servers 5a to 5c that it is prohibited to read data from the excluded node.

For example, when it is determined that the reference frequency is less than the predetermined threshold value, the node 10 deletes the temporary replica and notifies the proxy servers 5a to 5c that it is prohibited to read data from the node from which the temporary replica is deleted. Therefore, the resources of the system are not depleted by an unnecessary temporary replica and the storage system 1 can dynamically adjust the performance for the Get request.

When the resources of the node storing the phantom replica or the resources of the node storing the temporary replica are depleted, the storage system 1 deletes the phantom replica or the temporary replica. For example, when the resources of the node 10 are depleted, the node 10 deletes the stored temporary replica or phantom replica. Therefore, when the Put request dynamically adjusts the performance for the Get request, the storage system 1 can prevent the system resources from being carelessly depleted.

[b] Second Embodiment

The embodiment of the invention has been described above, but the invention is not limited to the above-described embodiment. Various embodiments other than the above-described embodiment can be made. Hereinafter, as another embodiment of the invention, a second embodiment will be described.

(1) For Update Data

When the Put request is received for the time from the generation of the phantom replica to the return of the phantom replica, the node 10 stores difference data before and after update. However, the embodiment is not limited thereto. For example, the node 10 may store the difference data in the node storing the phantom replica.

When the amount of difference data stored is more than a predetermined value, the node 10 may remove the difference data and delete the phantom replica. During this process, when the performance for the Put request or the Get request is adjusted, the storage system 1 can prevent the depletion of the resources.

(2) For Temporary Replica

When the resources are depleted, the node 10 deletes the stored temporary replica. However, the embodiment is not limited thereto. For example, when a predetermined time has elapsed from the storage of the temporary replica, the node 10 may delete the temporary replica.

When the temporary replica is stored and the update request is received, the node 10 deletes the temporary replica, thereby preventing the deterioration of the performance due to the temporary replica update process. However, the embodiment is not limited thereto. For example, the node 10 may receive data for a new updated temporary replica from the server which has generated the temporary replica and replace the existing data with the received data for the temporary replica.

(3) For Each Process

FIG. 3 illustrates only an illustrative example of the functional structure, but the processes performed by the units 20 to 32 may be combined or divided without departing from the scope and spirit of the invention. For example, the replica generating unit 28 and the replica generation request unit 29 may be integrated into one processing unit.

(4) For Client

In the storage system 1, the proxy servers 5a to 5c allocate the Put request or the Get request issued by the clients 2a and 2b to each of the nodes 10 to 10b, 11 to 11b, and 12 to 12b. However, the embodiment is not limited thereto. For example, each of the clients 2a and 2b may store the node which issues the Put request or the Get request in advance and directly issue the Put request or the Get request to the stored node. In this case, each of the nodes 10 to 10b, 11 to 11b, and 11 to 12b may notify the node storing a primary replica to the clients 2a and 2b, not the proxy servers 5a to 5c.

(5) For Phantom Replica

In the storage system 1, the node 10 uses the replica stored in the rear node as the phantom replica and excludes the rear node from the chain. However, the embodiment is not limited thereto. For example, the node 10 may use the replica stored in the node 12 as the phantom replica in the chain in which the node 10, the node 11, the node 12, and the node 12a are connected and exclude the node 12 from the chain.

When the node 12 is excluded from the chain, the node 10 notifies information indicating the phantom replica to the node 12 through the node 11. In this case, the node 12 notifies the rear node 12a to the node 11, which is the front node, and notifies the node 11, which is the front node, to the rear node 12a. Then, the node 11 may set the rear node to the node 12a and the node 12a may set the front node to the node 12.

(6) Program

Figure 13:
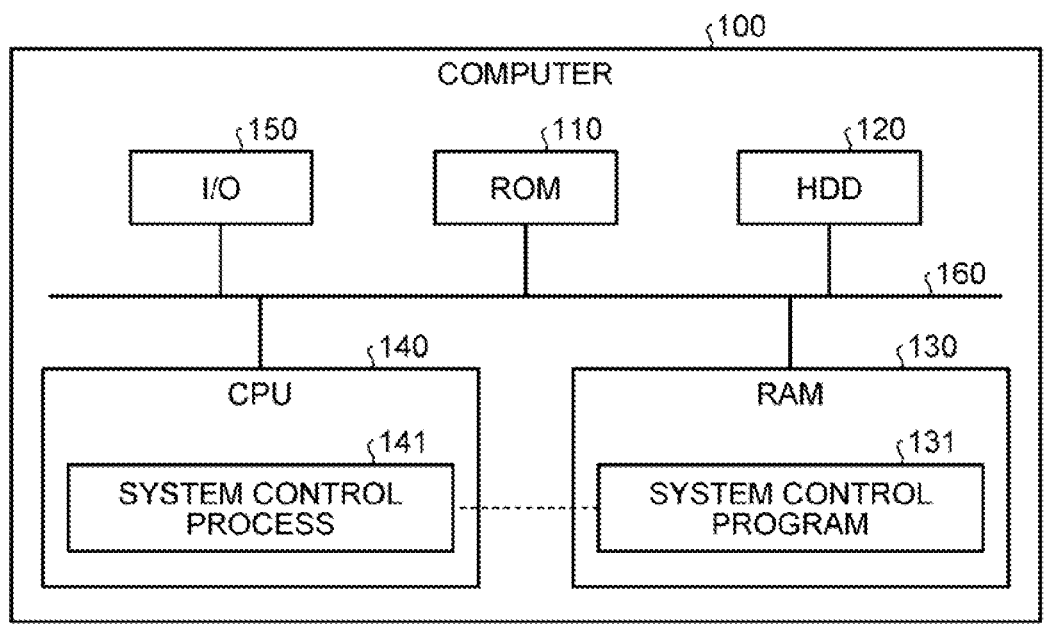
FIG. 13 is a diagram illustrating an example of a computer that executes a system control program.
Figure 14:
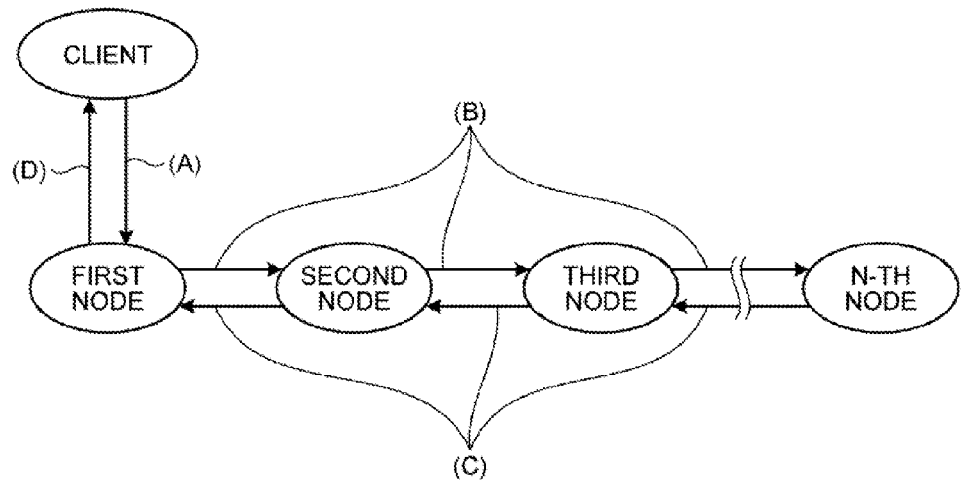
FIG. 14 is a first diagram illustrating an example of chain replication.
Figure 15:
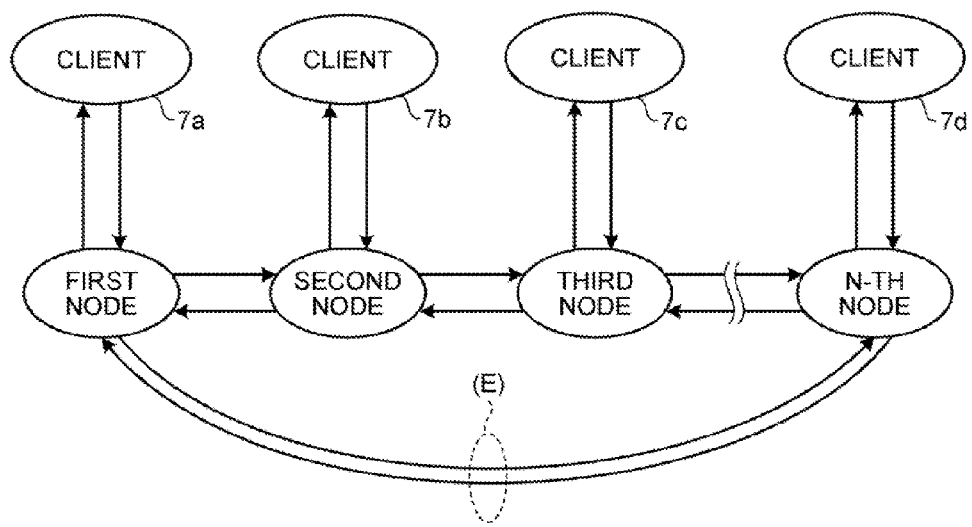
FIG. 15 is a second diagram illustrating an example of the chain replication.

In the first embodiment, the node 10 uses hardware to implement various processes. However, the embodiment is not limited thereto. For example, a computer serving as a storage device may execute a program which is prepared in advance to implement the processes. Next, an example of the computer which executes a program having the same function as that of the node 10 according to the first embodiment will be described with reference to FIG. 13. FIG. 13 is a diagram illustrating an example of the computer which executes a system control program.

In a computer 100 illustrated in FIG. 13, a ROM 110, an Hard Disk Drive (HDD) 120, a RAM 130, and a CPU 140 are connected to a bus 160. In addition, in the computer 100, an Input Output (I/O) 150 for communicate with other computers is connected to the bus 160.

The HDD 120 stores a normal replica, a temporary replica, and a phantom replica. The RAM 130 stores a system control program 131. The CPU 140 reads and executes the system control program 131, and functions as a system control process 141 in the example illustrated in FIG. 13. The system control process 141 has the same function as the node 10 illustrated in FIG. 3.

The system control program described in this embodiment may be implemented by the execution of a prepared program by a computer, such as a personal computer or a workstation. This program may be distributed through a network, such as the Internet. In addition, this program is recorded on a computer-readable recording medium, such as a hard disk, a flexible disk (FD), a Compact Disc Read Only Memory (CD-ROM), an Magneto-Optical Disc (MO), or a Digital Versatile Disc (DVD). Furthermore, the computer may read the program from the recording medium and then execute the program.

According to an aspect of the invention, the performance for a Put request and the performance for a Get request are dynamically adjusted.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage system having a plurality of storages forming a chain in which each storage among the plurality of storages transmits an update request to another of the plurality of storages sequentially, and each of the plurality of storages stores a same replica, wherein each of the storages comprising:
    a memory; and
    a processor coupled to the memory, wherein the processor executes a process comprising:
    transmitting an update request for data which is commonly stored in the plurality of storages according to a predetermined transmission order indicating a path to transfer the update request;
    updating data when receiving an update request from another storage;
    determining whether the number of times the update request is received for the chain for which the own storage is a starting point exceeds a predetermined threshold value; and
    when it is determined that the number of times exceeds the predetermined threshold value in the determining, changing the predetermined transmission order to a transmission order in which one or more storages included in the path are excluded.

2. The storage system according to claim 1, wherein, the changing includes changing, when there is a storage excluded from the path and the number of times the update request for the data is received is less than a predetermined threshold value, the predetermined transmission order to a transmission order in which the storage excluded from the path is returned to the path.

3. The storage system according to claim 2, the process further comprising:
    storing a difference in data due to an update when there is a storage excluded from the path and the update request is received; and
    applying, when there is the storage excluded from the path and the number of times the update request for the data is received is less than the predetermined threshold value, the difference stored at the storing to data stored in the storage excluded from the path.

4. The storage system according to claim 1, the process further comprising:
storing the data in a specific storage which does not store the data when the number of times a read request to read the data is received is greater than a predetermined threshold value;
adding the specific storage to the storage system; and
notifying a client, which is a transmission source of the read request, that data is available to be read from the specific storage.

5. The storage system according to claim 4, the process further comprising:
excluding the specific storage from the storage system when there is the specific storage in the storage system and the number of times the read request is received is less than the predetermined threshold value; wherein the notifying includes notifying the client that data is not available to be read from the specific storage.

6. The storage system according to claim 5, the process further comprising:
deleting the data stored in the specific storage excluded from the storage system when resources of the specific storage are depleted.

7. The storage system according to claim 5, wherein, the excluding includes excluding, when the resources of the specific storage are depleted, the specific storage from the storage system.

8. A storage system having a plurality of storages forming a chain in which each storage among the plurality of storages transmits an update request to another of the plurality of storages sequentially, and each of the plurality of storages stores a same replica, wherein each of the storages comprising:
a memory; and
a processor coupled to the memory, wherein the processor executes a process comprising:
transmitting, when receiving the read request to read data which is commonly stored in the plurality of storages, the data to a client which is a transmission source of the read request;
determining whether the number of times the read request is received exceeds a predetermined threshold value;
storing the data in a specific storage which does not store the data and which is not a part of the chain when the number of times the read request to read the data is received is greater than a predetermined threshold value;
adding the specific storage to the storage system but not to the chain; and
notifying the client that data is available to be read from the specific storage.

9. The storage system according to claim 8, the process further comprising:
excluding the specific storage from the storage system when there is the specific storage and the number of times the read request for the data is received is less than the predetermined threshold value; wherein the notifying includes notifying the client that data is not available to be read from the specific storage.

10. A storage device included in a storage system having a plurality of storage devices forming a chain in which each storage device among the plurality of storage devices transmits an update request to another of the plurality of storage devices sequentially, and each of the plurality of storage devices stores a same replica, the storage device comprising:
a memory; and
a processor coupled to the memory, wherein the processor executes a process comprising:
transmitting an update request for data which is commonly stored in the plurality of storage devices according to a predetermined transmission order indicating a path to transfer the update request;
updating data when receiving an update request from another storage device;
determining whether the number of times the update request is received for the chain for which the own storage device is a starting point exceeds a predetermined threshold value; and
when it is determined that the number of times exceeds the predetermined threshold value in the determining, changing the predetermined transmission order to a transmission order in which one or more storage devices included in the path are excluded.

11. A storage device included in a storage system having a plurality of storage devices forming a chain in which each storage device among the plurality of storage devices transmits an update request to another of the plurality of storage devices sequentially, and each of the plurality of storage devices stores a same replica, the storage device comprising:
a memory; and
a processor coupled to the memory, wherein the processor executes a process comprising:
transmitting, when receiving the read request to read data which is commonly stored in the plurality of storage devices, the data to a client which is a transmission source of the read request;
determining whether the number of times the read request is received exceeds a predetermined threshold value;
storing the data in a specific storage device which does not store the data and which is not a part of the chain when the number of times the read request to read the data is received is greater than a predetermined threshold value;
adding the specific storage device to the storage system but not to the chain; and
notifying the client that data is available to be read from the specific storage device.

12. A non-transitory computer-readable recording medium having stored therein a system control program for causing a storage included in a storage system having a plurality of storages forming a chain in which each storage among the plurality of storages transmits an update request to another of the plurality of storages sequentially, and each of the plurality of storages stores a same replica to execute a system control process comprising:
transmitting an update request for data which is commonly stored in the plurality of storages according to a predetermined transmission order indicating a path to transfer the update request;
updating data when receiving an update request from another storage;
determining whether the number of times the update request is received for the chain for which the own storage is a starting point exceeds a predetermined threshold value; and
when it is determined that the number of times exceeds the predetermined threshold value in the determining, changing the predetermined transmission order to a transmission order in which one or more storages included in the path are excluded.

13. A non-transitory computer-readable recording medium having stored therein a system control program for causing a storage included in a storage system having a plurality of storages forming a chain in which each storage among the plurality of storages transmits an update request to another of the plurality of storages sequentially, and each of the plurality of storages stores a same replica to execute a system control process comprising:

transmitting, when receiving the read request to read data which is commonly stored in the plurality of storages, the data to a client which is a transmission source of the read request;

determining whether the number of times the read request is received exceeds a predetermined threshold value;

storing the data in a specific storage which does not store the data and which is not a part of the chain when the number of times the read request to read the data is received is greater than a predetermined threshold value;

adding the specific storage to the storage system but not to the chain; and notifying the client that data is available to be read from the specific storage.

14. A system control method that is performed by a storage system which has a plurality of storages forming a chain in which each storage among the plurality of storages transmits an update request to another of the plurality of storages sequentially, and each of the plurality of storages stores a same replica, the system control method comprising:

transmitting an update request for data which is commonly stored in the plurality of storages according to a predetermined transmission order indicating a path to transfer the update request;

updating data stored in a storage when receiving an update request from another storage;

determining whether the number of times the update request is received for the chain for which the own storage is a starting point exceeds a predetermined threshold value; and when it is determined that the number of times exceeds the predetermined threshold value in the determining, changing the predetermined transmission order to a transmission order in which one or more storages included in the path are excluded.

15. A system control method that is performed by a storage system which has a plurality of storages forming a chain in which each storage among the plurality of storages transmits an update request to another of the plurality of storages sequentially, and each of the plurality of storages stores a same replica, the system control method comprising:

transmitting, when receiving the read request to read data which is commonly stored in the plurality of storages, the data to a client which is a transmission source of the read request;

determining whether the number of times the read request is received exceeds a predetermined threshold value;

storing the data in a specific storage which does not store the data and which is not a part of the chain when the number of times the read request to read the data is received is greater than a predetermined threshold value;

adding the specific storage to the storage system but not to the chain; and notifying the client that data is available to be read from the specific storage.

\* \* \* \* \*